(12) United States Patent
DeGraw et al.

(10) Patent No.: US 11,938,554 B2
(45) Date of Patent: *Mar. 26, 2024

(54) ELECTROPLATING OF NIOBIUM TITANIUM

(71) Applicant: International Business Machines Corporation, Armonk, NY (US)

(72) Inventors: Danielle DeGraw, Pleasant Valley, NY (US); Yat-Kiu-Kent Fung, Woodside, NY (US); James Robert Rozen, Peekskill, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 373 days.

This patent is subject to a terminal disclaimer.

(21) Appl. No.: 17/342,805

(22) Filed: Jun. 9, 2021

(65) Prior Publication Data
US 2021/0296749 A1    Sep. 23, 2021

Related U.S. Application Data

(63) Continuation of application No. 16/170,760, filed on Oct. 25, 2018, now Pat. No. 11,075,435.

(51) Int. Cl.
*H01P 3/06*    (2006.01)
*B23K 1/00*    (2006.01)
(Continued)

(52) U.S. Cl.
CPC .......... *B23K 1/0016* (2013.01); *B23K 1/0008* (2013.01); *C25D 3/12* (2013.01);
(Continued)

(58) Field of Classification Search
CPC .. H01B 11/1817; H01B 12/00; H01B 13/016; C25D 3/12; C25D 3/38; C25D 5/12;
(Continued)

(56) References Cited

U.S. PATENT DOCUMENTS 3,057,048 A    10/1962    Tirakis
3,167,692 A    1/1965    Matthias
(Continued)

FOREIGN PATENT DOCUMENTS

CN    102173449 A    9/2011
CN    105870026 A    8/2016
(Continued)

OTHER PUBLICATIONS

Final Office Action received for U.S. Appl. No. 16/859,363 dated Mar. 17, 2022, 25 pages.
(Continued)

*Primary Examiner* — William H. Mayo, III
(74) *Attorney, Agent, or Firm* — Amin, Turocy & Watson, LLP

(57) ABSTRACT

A structure, such as a cable assembly, is provided that has a Nb/Ti substrate and a metal layer electroplated on a portion of the Nb/Ti substrate, wherein the metal layer has a metal capable of being soldered to, such as copper, and a metal coaxial connector soldered to the metal layer.

20 Claims, 8 Drawing Sheets

(51) Int. Cl.

| | |
|---|---|
| *C25D 3/12* | (2006.01) |
| *C25D 3/38* | (2006.01) |
| *C25D 5/12* | (2006.01) |
| *C25D 5/34* | (2006.01) |
| *C25D 5/38* | (2006.01) |
| *C25D 7/06* | (2006.01) |
| *H01B 11/18* | (2006.01) |
| *H01B 12/00* | (2006.01) |
| *H01P 11/00* | (2006.01) |
| *B23K 101/38* | (2006.01) |
| *H01B 13/016* | (2006.01) |

(52) U.S. Cl.
CPC ............... *C25D 3/38* (2013.01); *C25D 5/12* (2013.01); *C25D 5/34* (2013.01); *C25D 5/38* (2013.01); *C25D 7/0607* (2013.01); *H01B 11/1817* (2013.01); *H01B 12/00* (2013.01); *H01P 3/06* (2013.01); *H01P 11/005* (2013.01); *B23K 2101/38* (2018.08); *H01B 13/016* (2013.01)

(58) Field of Classification Search
CPC .......... C25D 5/34; C25D 5/38; C25D 7/0607; B23K 1/0016
USPC ....................................................... 174/126.2
See application file for complete search history.

(56) References Cited

U.S. PATENT DOCUMENTS

| | | | |
|---|---|---|---|
| 3,328,271 A | 6/1967 | Kneip, Jr. et al. | |
| 3,708,866 A | 1/1973 | Wells | |
| 4,686,017 A * | 8/1987 | Young ....................... | C05C 9/00 205/267 |
| 4,942,379 A * | 7/1990 | Ogawa ................... | H10N 60/20 324/318 |
| 4,964,967 A * | 10/1990 | Hashimoto ............ | B23K 35/32 148/903 |
| 6,527,924 B1 | 3/2003 | Andolfatto et al. | |
| 6,932,874 B2 | 8/2005 | Marancik et al. | |
| 9,006,147 B2 | 4/2015 | Taylor et al. | |
| 10,141,493 B2 * | 11/2018 | Tuckerman ............ | H10N 60/20 |
| 2005/0103519 A1 | 5/2005 | Brandsberg et al. | |
| 2006/0225918 A1 | 10/2006 | Chinda et al. | |
| 2008/0163474 A1 | 7/2008 | Hong et al. | |
| 2009/0082865 A1 * | 3/2009 | Raja ....................... | C25D 11/26 205/171 |
| 2012/0304694 A1 * | 12/2012 | Derrig .................... | A44C 27/00 63/35 |
| 2017/0321069 A1 | 11/2017 | Zhao et al. | |
| 2019/0279792 A1 | 9/2019 | Debry et al. | |

FOREIGN PATENT DOCUMENTS

| | | |
|---|---|---|
| EP | 8 95 284 A1 | 3/1999 |
| JP | 4-65032 A | 3/1992 |
| JP | 07-094624 A | 4/1995 |
| JP | 2604379 B2 | 4/1997 |
| JP | 4258397 B2 | 4/2009 |

OTHER PUBLICATIONS

Notice of Allowance received for U.S. Appl. No. 16/859,363 dated Mar. 2, 2023, 17 pages.
Non Final Office Action received for U.S. Appl. No. 16/859,363 dated Nov. 10, 2022, 20 pages.
Non-Final Office Action received for U.S. Appl. No. 16/859,363 dated Nov. 26, 2021, 22 pages.
Baker et al., "An Experimental Study of Metal Polishing by Flexible Polishing Wheels", Transactions of the Electrochemical Society 1931, vol. 59, No. 1, pp. 483-498.
"Material Technical Data", Magnetic Shields Electromagnetic Engineering, URL: https://magneticshields.co.uk/technical/material-technical-data, 3 pages.
Baudrand, "Plating Onto Difficult-to-Plate Metals" Guest Editorial—for Plateworld.com, Retrieved: Jul. 20, 2018, 3 pages.
Kushner, "Platinum on Niobium and Titanium," Experts Post: Jul. 1, 2008, https://www.pfonline.com/articles/platinumt-on-niobium-and-titanium, 1 page.
Tian, et al., "The Mechanism of Electropolishing of Niobium in Hydrofluoric-Sulfuric Acid Electrolyte," Journal of The Electrochemical Society, 155 (9) pp. 563-568, (2008).
Non-Final Office Action received for U.S. Appl. No. 16/170,760 dated Apr. 2, 2020, 21 pages.
List of IBM Patents or Applications treated as related.
Non-Final Office Action received for U.S. Appl. No. 16/170,760 dated Sep. 18, 2021, 22 pages.

\* cited by examiner

ELECTROPLATING OF NIOBIUM TITANIUM

TECHNICAL FIELD

This disclosure relates to electroplating niobium titanium and more particularly to electroplating niobium titanium with a metal capable of being soldered to.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. The subject disclosure relates to electroplating niobium titanium (Nb/Ti) with a metal capable of being soldered.

According to an embodiment, a structure is provided that comprises a Nb/Ti substrate and a metal layer plated on a portion of the Nb/Ti substrate. The metal layer comprises an electroplated metal layer plated on the portion of the Nb/Ti substrate using electroplating. The metal layer can comprise a metal capable of being soldered to. In various implementations, the metal layer comprises a metal selected from a group comprising copper (Cu) and nickel (Ni). In some implementations, the metal layer comprises a first layer of Ni adhered directly to a surface of the portion of the Nb/Ti substrate, and second layer of Cu adhered to the first layer.

In one or more implementations, the structure can further comprise a metal contact surface soldered to the metal layer. For example, the metal contact surface can comprise Cu, Ni, or another metal capable of being soldered to the metal layer. In various implementations, the Nb/Ti substrate comprises a Nb/Ti wire. With these implementations, the metal contact surface can comprise a surface of a coaxial connector. For example, the coaxial connector can comprise a microwave coaxial connector, such as a sub-miniature version A (SMA) type connector.

In another embodiment, a cable assembly is provided that comprises a Nb/Ti wire, a metal layer plated on a first portion of the Nb/Ti wire, and a metal coaxial connector soldered to the metal layer. The metal layer plated comprises an electroplated metal layer plated on the first portion of the Nb/Ti wire using electroplating. In one or more implementations, the metal layer comprises a metal selected from a group comprising Cu and Ni. In some embodiments, the cable assembly further comprises a qubit physically coupled to a first end of the Nb/Ti wire via the metal coaxial connector, and an amplifier physically coupled to a second end of the Nb/Ti wire via a second metal coaxial connecter soldered to the plated metal layer.

In one or more additional embodiments, a method is provided that comprises preparing a surface of a Nb/Ti substrate, resulting in a prepared surface, wherein the preparing comprises sanding the surface of the Nb/Ti substrate. The method further comprises electroplating a metal film onto the prepared surface, wherein the metal film is selected from a group comprising Cu and Ni. In some implementations, prior to the sanding, the method comprises polishing the surface of the Nb/Ti substrate using a mechanical polishing wheel. In addition, in some implementations, after the sanding, the method can comprise dipping the surface of the Nb/Ti substrate in a hydrochloric acid (HCl) solution. The method can further comprise soldering a metal surface to the metal film. For example, in implementations in which the Nb/Ti substrate comprises a Nb/Ti wire, the soldering can comprise soldering a metal coaxial connector to the metal film.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
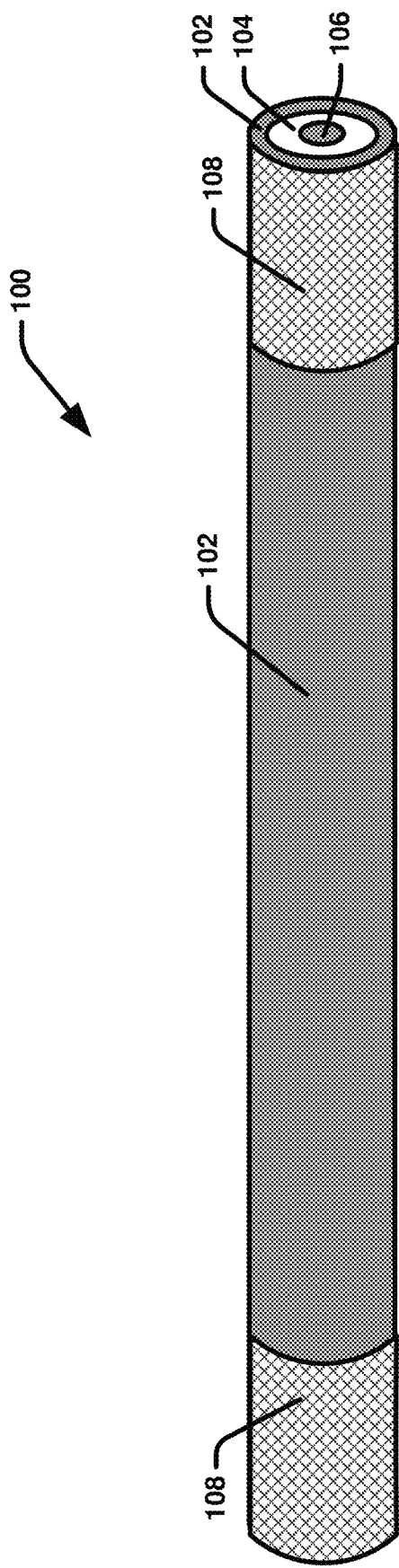
FIG. 1 presents an example structure comprising a Nb/Ti substrate with a metal layer plated onto a surface of the Nb/Ti substrate in accordance with one or more embodiments described herein.

The following detailed description is merely illustrative and is not intended to limit embodiments and/or application or uses of embodiments. Furthermore, there is no intention to be bound by any expressed or implied information presented in the preceding Summary section or in the Detailed Description section.

One or more embodiments is directed to plating a material capable of being soldered (hereinafter, a "solderable" material) onto the exterior surface of a coaxial cable formed with a metal material that comprising an alloy of niobium (Nb) and titanium (Ti), hereinafter referred to as Nb/Ti. The major technological hurdle to using a Nb/Ti coaxial cable in many electronic circuit applications is that the Nb/Ti metal forms an incredibly tough, hard oxide layer whenever it is heated above room temperature. This oxide prevents the Nb/Ti metal from being soldered in any normal fashion except under a high vacuum.

Various embodiments are directed to techniques for forming a metal layer comprising a solderable material, such as copper (Cu) and/or nickel (Ni), onto the surface of a Nb/Ti coaxial cable using electroplating. In one or more embodiments, a mechanical polishing wheel can be initially used to remove oxidation and foreign material from the Nb/Ti cable surface, followed by a manual sanding to roughen the surface. The Nb/Ti cable can further be dipped into a hydrochloric acid (HCl) solution to clean the surface and remove any residual debris. Electroplating can then be performed to deposit a layer of solderable metal onto the prepared surface of the cable. The electroplating process can involve a standard electrolysis plating process, wherein the prepared surface of the cable is placed in a metal sulfamate bath. Notably, with the disclosed plating procedure, the deposition metal adheres strongly to the prepared surface of the Nb/Ti cable without usage of a nickel or wood strike step used in association with the electroplating.

Because the plated layer is both solderable and has excellent mechanical adhesion to the parent Nb/Ti metal, the plated layer permits the attachment of metal connector to the plated metal layer using same or similar soldering techniques employed for standard copper coaxial cables. In this regard, in one or more embodiments, after the metal layer has been electroplated onto the Nb/Ti cable, a metal connector can be soldered directly onto the metal layer, thereby forming a cable assembly. In various embodiments, the metal connector can include a standard microwave connector such as a sub-miniature version A (SMA) type connector. The cable assembly can operate at ultra-low-temperatures (e.g., less than 1.0 Kelvin) with excellent transmission, low attenuation, constant impedance, and no undesirable signal reflections. The mechanical strength at all temperatures is likewise indistinguishable from an ordinary terminated copper coaxial line. Accordingly, in various embodiments, the disclosed Nb/Ti cable assembly can serve as an excellent waveguide for superconducting quantum bit (qubit) circuits.

Some embodiments are particularly directed to electroplating a Nb/Ti coaxial cable or wire with a solderable metal for the purpose of soldering a connecter thereto to form a cable assembly capable of being used for electronic circuit applications, including usage as waveguide for qubit readout. However, the disclosed techniques are not limited to this specific application. For example, the disclosed techniques can be used to plate a metal layer onto various types of Nb/Ti substrates and to solder various types of metal objects or objects comprising metal surfaces to the plated metal layer.

One or more embodiments are now described with reference to the drawings, wherein like referenced numerals are used to refer to like elements throughout. It should be appreciated that the various structures depicted in the drawings are merely exemplary and are not drawn to scale. In the following description, for purposes of explanation, numerous specific details are set forth in order to provide a more thorough understanding of the one or more embodiments. It is evident, however, in various cases, that the one or more embodiments can be practiced without these specific details. In addition, certain elements may be left out of particular views for the sake of clarity and/or simplicity when explanations are not necessarily focused on the omitted elements. Moreover, the same or similar reference numbers used throughout the drawings are used to denote the same or similar features, elements, or structures, and thus, a detailed explanation of the same or similar features, elements, or structures will not be repeated for each of the drawings.

As used herein, unless otherwise specified, terms such as on, overlying, atop, on top, positioned on, or positioned atop mean that a first element is present on a second element, wherein intervening elements may be present between the first element and the second element. As used herein, unless otherwise specified, the term directly used in connection with the terms on, overlying, atop, on top, positioned, positioned atop, contacting, directly contacting, or the term direct contact, mean that a first element and a second element are connected without any intervening elements, such as, for example, intermediary conducting, insulating or semiconductor layers, present between the first element and the second element. As used herein, terms such as upper, lower, above, below, directly above, directly below, aligned with, adjacent to, right, left, vertical, horizontal, top, bottom, and derivatives thereof shall relate to the disclosed structures as oriented in the drawing figures.

With reference to FIG. 1, presented is an example structure 100 comprising a Nb/Ti substrate with a metal layer plated onto a surface of the Nb/Ti substrate in accordance with embodiments described herein. In the embodiment shown, structure 100 can be or correspond to a coaxial cable or wire. (The terms cable, wire, coax and the like are herein interchangeably). For example, the coaxial cable/wire can comprise an outer jacket layer or substrate layer 102, an insulator layer 104 formed within the substrate layer 102 and an inter-conductor layer 106 formed within and surrounded by the insulator layer 104. The outer jacket layer or substrate layer 102 can be or correspond to a metal tube formed with a Nb/Ti alloy. The inter-conductor layer 106 can be or correspond to a solid wire, also formed with a Nb/Ti alloy. The insulator layer 104 formed between the substrate layer 102 and the inter-conductor layer 106 can comprise a suitable insulating material, such as polytetrafluoroethylene. The dimensions of the coaxial cable or wire can vary. In various embodiments, the coaxial cable or wire can have a length up to about 1.0 meter (m) and a diameter up to about 5.0 centimeters (cm) in length.

Structure 100 further comprises a metal layer 108 plated onto a portion of the surface of the substrate layer 102 using electroplating after the portion has been prepared in accordance with the techniques described infra. As a result, the metal layer 108 can be or correspond to a thin film or coating that is permanently adhered to the surface of the substrate layer 102. In the embodiment shown, the metal layer 108 is formed on both ends of the coaxial cable/wire (structure 100) to enable attachment of coaxial connectors to both ends of the cable/wire. However, the position and configuration of the metal layer 108 on the surface of the substrate layer can vary 102. For example, in some implementations, the metal layer 108 can be formed on only one end of the cable/wire. In other implementation, the metal layer 108 can be formed at more than two locations on the surface of the substrate layer 102. Still in other embodiments, an entirety of the surface of the substrate layer 102 can be coated with the metal layer 108. The dimensions of the metal layer 108 can also vary. For example, in some implementations, the metal layer 108 can form a continuous ring around the perimeter of an end of the cable/wire. In other implementations, the metal layer 108 can be discontinuous.

The metal layer 108 can comprise a metal capable of being soldered to using standard Cu to Cu soldering techniques, or similar metal to metal soldering techniques. For example, in some embodiments, the metal layer 108 can comprise Cu. In other embodiments, the metal layer 108 can comprise Ni. In another embodiment, the metal layer 108 can comprise a combination of Cu and Ni. For example, in one embodiment, the metal layer 108 can comprise a first layer of Ni formed directly on and contacting the surface of the substrate layer 102. The metal layer 108 can further comprise a second layer of Cu formed directly on and contacting the first layer. Other suitable metals that can be electroplated onto the surface of the substrate layer 102 to form the metal layer 108 can include but are not limited to, cobalt, chromium and iron.

In this regard, a major technological hurdle to using a Nb/Ti material as a coaxially waveguide for superconducting qubits (or for other electronic circuit applications) is that the Nb/Ti metal forms an incredibly tough, hard oxide layer whenever it is heated above room temperature. This oxide prevents the metal from being soldered in any normal fashion except under a high vacuum. Another approach involves using an ultrasonic soldering iron to break down the oxide layer on the metal to render it solderable. This approach does not provide a mechanically strong solder joint because the solder does not wet the parent metal fully, and the type of solder material that can be used is restricted. Another approach is to swage a solderable sleeve on to the exterior of the coax waveguide, and then spot weld the sleeve in place. This approach does provide a mechanically robust joint but is time consuming and the resultant microwave assembly has undesirable electrical reflections.

In accordance with method the disclosed techniques, a metal connector (or another metal object), such as a microwave connector (e.g., a SMA type connector) can be soldered directly to an electroplated metal film or metal layer (e.g., metal layer 108) formed on the end of a Nb/Ti coaxial cable using a standard low temperature (e.g., less than 350 degrees Celsius (° C.)) soldering process. For example, the standard low temperature soldering process can involve the use of flux (e.g. rosin, acid, and the like) with heat (typically less than 350° C.), and a solder material (e.g. lead tin, silver tin, and the like). As a result, with the disclosed techniques, a metal connector can be efficiently soldered to the metal plated end (e.g., metal layer 108) of a Nb/Ti cable without the need and the corresponding drawbacks of a high vacuum soldering procedure, an ultrasonic soldering iron, and/or a solderable sleeve spot welding procedure.

Figure 2:
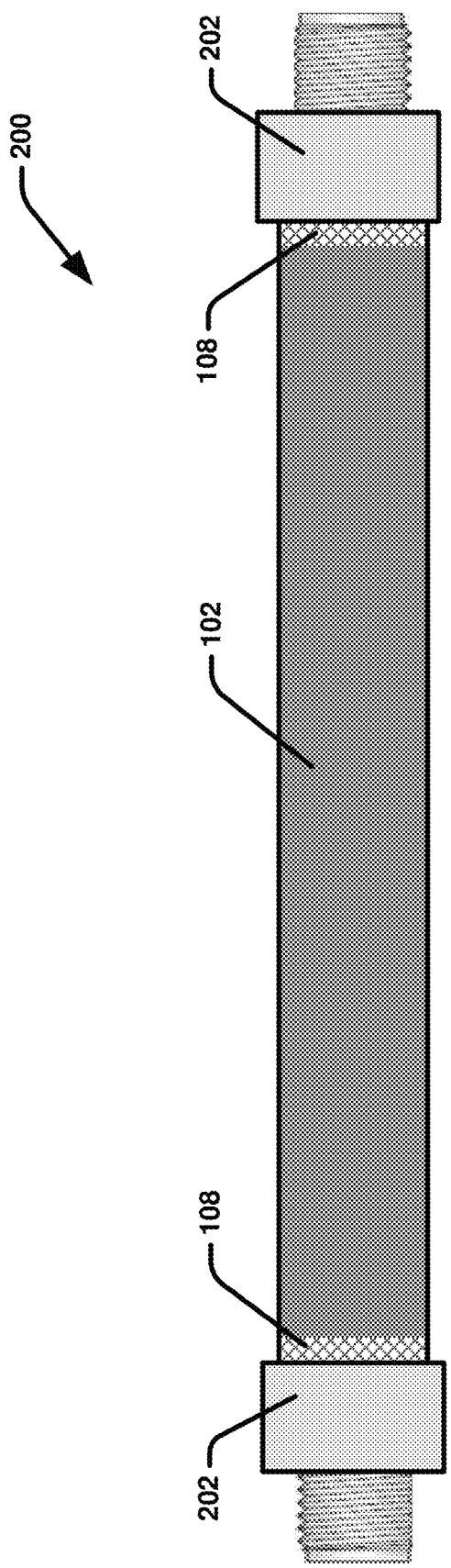
FIG. 2 presents an example structure comprising a Nb/Ti substrate with a metal object soldered to a metal plated surface of the Nb/Ti substrate in accordance with one or more embodiments described herein.

FIG. 2 presents an example structure 200 comprising a Nb/Ti substrate with a metal object soldered to a metal plated surface of the Nb/Ti substrate in accordance with embodiments described herein. In the embodiment shown, structure 200 corresponds to structure 100 with the addition of metal connectors 202 attached to respective ends of the Nb/Ti cable/wire. In this regard, structure 200 can be or correspond to a coaxial cable assembly. Repetitive description of like elements employed in respective embodiments is omitted for sake of brevity The metal connectors 202 are respectively bonded to or soldered onto respective ends of the Nb/Ti cable/wire via the metal layer 108 (e.g., using the standard soldering techniques described above). For example, in the embodiment shown, the metal connectors 202 respectively cover the metal layer 108 plated on the surface of the substrate layer 102. A portion of the metal layer 108 is shown as exposed merely for exemplary purposes to indicate the location of the metal layer 108 is beneath the metal connectors 202. In this regard, in some embodiments, the metal connectors 202 can entirely cover the metal layer 108. The metal connectors 202 can comprise a metal (or metal surface) capable of being soldered directly onto the metal layer 108 using the standard Cu to Cu soldering techniques or similar metal to metal soldering techniques described above. For example, in some embodiments, the metal connectors 202 can comprise Cu and/or Ni. Other suitable materials that can be used for the metal connectors can include but are not limited to: gold, aluminum, brass, copper, nickel, steel, and iron.

As described above, standard metal to metal soldering techniques employ a solder material with a lower melting point than the respective metals to solder the respective metals to one another. In this regard, although not shown, structure 200 can further comprise a solder material formed between the metal layer 108 and the opposing metal surface of the metal object, such as the metal connectors 202, bonded or soldered thereto. For example, in implementations in which the respective metals comprise Cu, the solder material can comprise of lead, tin, and silver. In another example implementation in which the surface of the metal layer 108 comprises Ni, the solder material can comprise of lead, tin, and silver. Other suitable solder materials can include but are not limited to alloys comprised of two or more of the following: indium, tin, bismuth, silver, zinc, lead, and gallium.

In various embodiments, the metal connectors 202 can be or correspond to microwave coaxial cable connectors. For example, in some embodiment, the metal connectors 202 can be or correspond to standard SMA connectors. In accordance with these embodiments, the cable assembly represented by structure 200 can operate at ultra-low-temperatures (e.g., less than 1.0 Kelvin) with excellent transmission, low attenuation, constant impedance, and no undesirable signal reflections. The mechanical strength of structure 200 at all temperatures is likewise indistinguishable from an ordinary terminated copper coaxial line. In some embodiments, the cable assembly can have a frequency range that extends up to about 10.0 gigahertz (GHz) to enable usage of the cable assembly for qubit waveguide readout.

Figure 3:
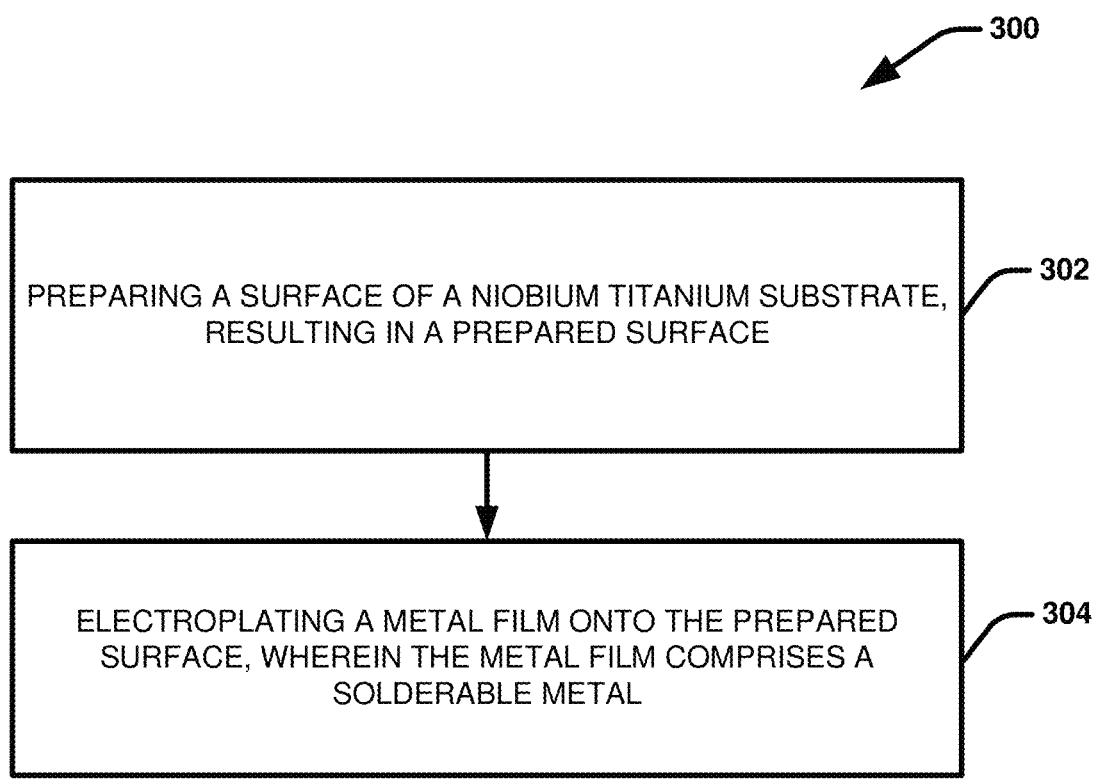
FIG. 3 presents a high-level flow diagram of an example method for forming a metal layer on a surface of a Nb/Ti substrate in accordance with one or more embodiments described herein.

FIG. 3 presents a high-level flow diagram of an example method 300 for forming a metal layer on a surface of a Nb/Ti substrate in accordance with one or more embodiments. In one or more embodiments, method 300 can be employed to form structure 100. For example, method 300 can be employed to form the metal layer 108 directly on the surface of a Nb/Ti substrate layer (e.g., substrate layer 102). In this regard, method 300 can be used to form a plated metal layer on the surface of a Nb/Ti coaxial cable/wire. Repetitive description of like elements employed in respective embodiments is omitted for sake of brevity.

With reference to FIG. 3 in connection with reference to FIG. 1, in accordance with method 300, at 302, the surface of a Nb/Ti substrate (e.g., structure 100) can be prepared, resulting in a prepared surface. For example, in implementations in which the Nb/Ti substrate comprises a Nb/Ti cable/wire, at least one end portion of the Nb/Ti cable/wire can be prepared. At 304, a metal film can be electroplated onto the prepared surface, wherein the meal film comprises a solderable metal, such as Cu, Ni, or a combination thereof. In this regard, after the end portions of the Nb/Ti cable/wire have been prepared, the metal layer 108 can be formed thereon using electroplating.

The surface preparation at 302 is of particular importance to ensure adhesion of the electroplated metal onto the surface of the Nb/Ti substrate. In one or more embodiments, the surface preparation can involve using a mechanical polishing wheel to mechanically polish the portion of the Nb/Ti substrate surface to be plated. This mechanical polishing can remove oxidation and foreign material from the surface of the Nb/Ti substrate. In some implementations, the mechanical polishing can involve contacting the portion of the Nb/Ti substrate to be plated with the mechanical polishing wheel for a relatively short duration (e.g., 5.0 to 20.0 seconds, which can vary depending on the size of the area to be plated). For example, in implementations in which the substrate comprises a Nb/Ti cable/wire, the end (or respective ends) of the cable/wire can be held against the mechanical polishing wheel while rotating the cable to ensure the entire circumference of the cable/wire is polished. After the mechanical polishing, the preparation can further involve sanding the polished surface to roughen the surface. In various embodiments, the sanding can involve manual sanding with emery paper (also referred to as sandpaper) of a suitable grit. For example, in one or more embodiments, the emery paper can have a grit between about 40 and 220.

Figure 4B:
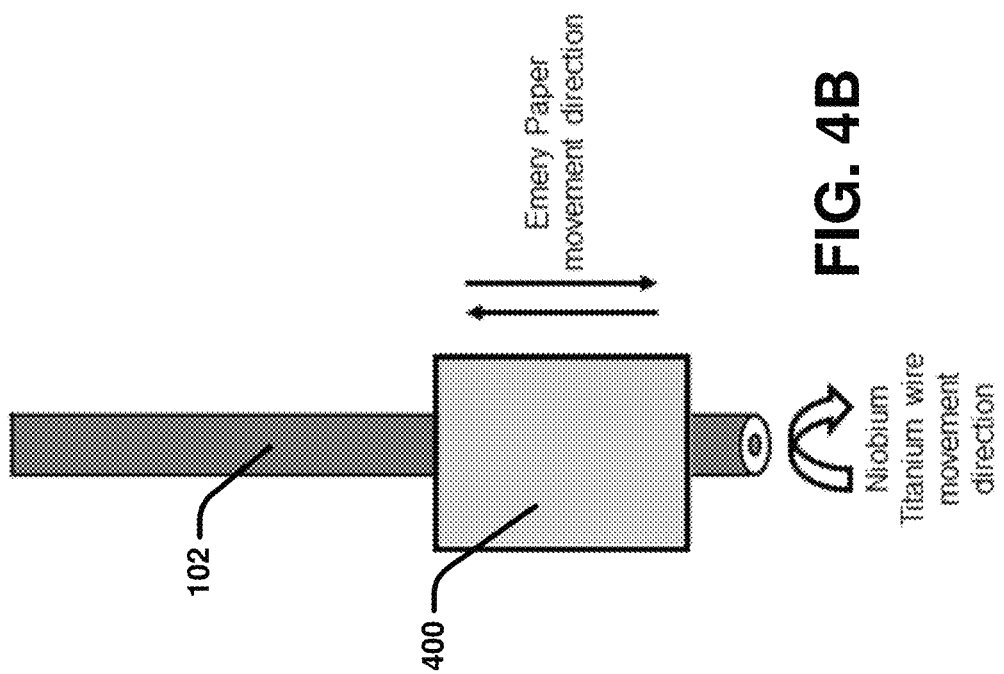
FIGS. 4A and 4B illustrate an example sanding process for sanding the surface of a Nb/Ti wire to facilitate adhesion of an electroplated metal layer thereto in accordance with one or more embodiments described herein.
Figure 4A:
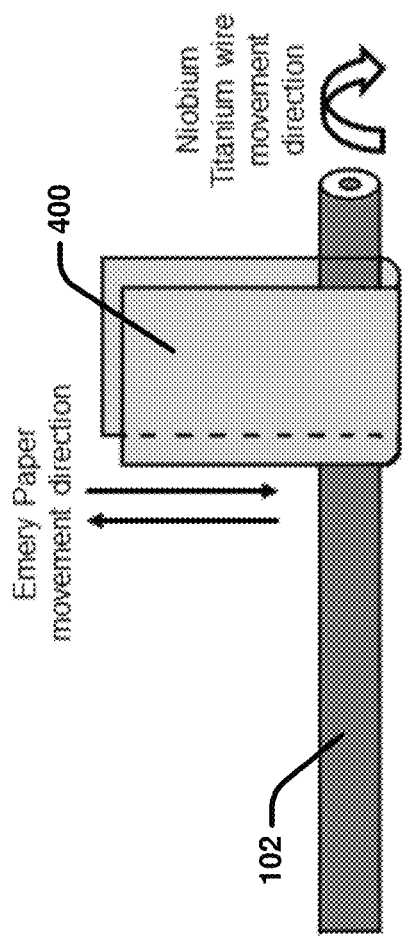

FIGS. 4A and 4B illustrate an example sanding process for sanding the surface of a Nb/Ti wire to facilitate adhesion of an electroplated metal layer (e.g., metal layer 108) thereto in accordance with embodiments described herein. As shown in FIG. 4A the sanding process can involve rotating the emery paper 400 in a direction perpendicular to the wire, followed by rotating the emery paper 400 in a direction parallel to the wire, as shown in FIG. 4B. In other embodiments, the sanding can be performed in the reverse order (e.g., parallel as in 4B and then perpendicular as in 4A).

With reference again to FIG. 3, the preparation at 302 can further include dipping the sanded Nb/Ti substrate into a HCl solution (e.g., a 1:1 HCl solution) to clean the surface and remove any residual debris. For example, in one implementation, the sanded Nb/Ti substrate can be submerged in the HCl solution for about 2.0 minutes. In implementations in which the Nb/Ti substrate comprises a coaxial cable/wire, a coating of stop-off lacquer (e.g., MICROSTOP™) can be applied to the exposed ends of the wire to protect the wire properties during plating. The stop-off lacquer can be applied before the HCl dip. The HCl dipped Nb/Ti substrate can further be rinsed (e.g., for about 10 seconds) with deionized water before electroplating.

After the surface of the Nb/Ti substrate is prepared in accordance with the techniques described above, the electroplating at 304 can be performed to deposit a layer of solderable metal onto the prepared surface of the Nb/Ti substrate. The electroplating process can involve a standard electrolysis plating process that involves placing the prepared surface of the Nb/Ti substrate (e.g. the cable/wire) in a metal sulfamate bath. For example, in one or more example embodiments in which the Nb/Ti substrate comprises a Nb/Ti cable/wire, the prepared end (or ends) of the cable/wire can be electroplated with Ni using a Ni sulfamate bath. In one implementation, the amps per square feet (ASF) used for the Ni sulfamate bath can be about 10. In accordance with this implementation, the electroplating can be performed for about 20 minutes to deposit about 2.0-3.0 microns of Ni onto the submerged surface of the Nb/Ti cable/wire. In some embodiments, the Nb/Ti cable/wire can be cleansed to remove unbound Ni formed on the unprepared portion of the surface of the Nb/Ti cable/wire. In this regard, Ni deposited on a portion of the Nb/Ti cable/wire that was not prepared in accordance with the techniques described above can be removed by a simple tape test. However, the Ni adheres strongly to the prepared surface of the Nb/Ti cable (even without usage of a nickel or wood strike step used in association with the electroplating). After the unbound Ni is removed, in some implementations, a metal object or an object with a metal surface (e.g., a metal connector 202) can be soldered directly to the Ni plated portion of the Nb/Ti wire.

In another example embodiment, a second electroplating process can be applied to the Ni plated Nb/Ti cable/wire to form a layer of Cu overtop of the layer of Ni. In this regard, the Ni plated portion of the Nb/Ti substrate can server as a seed layer for the plating of Cu directly thereto with strong adhesion. For example, the Ni plated end (or ends) of the Nb/Ti cable/wire can be electroplated with Ni using a Ni sulfamate bath. In one implementation, the ASF used for the Ni sulfamate bath can be about 100 or more. In accordance with this implementation, the electroplating can be performed for about 5.0 minutes to deposit about 10.0-15.0 microns of Ni on the Nb/Ti cable/wire. In some embodiments, the Nb/Ti cable/wire can be cleansed to remove unbound Cu (and unbound Ni if not previously removed) formed on the unprepared surface of the Nb/Ti cable/wire. In this regard, Cu deposited on a portion of the Nb/Ti cable/wire was not prepared and/or coated with Ni in accordance with the techniques described above can also be removed by the simple tape test. However, the Cu adheres strongly to the Ni plated portion of the surface of the Nb/Ti cable (even without usage of a nickel or wood strike step used in association with the electroplating). After the unbound Cu (and potentially unbound Ni) is removed, a metal object (e.g., a metal connector 202) can be soldered directly to the Cu plated portion of the Nb/Ti cable/wire.

In another example embodiment, Cu can be electroplated directly to the prepared portion of the Nb/Ti substrate using same or similar electroplating techniques described above. For example, the prepared surface of a Nb/Ti cable/wire can be submerged in a Cu plating bath and electroplated to form a Cu layer thereon. Unbound Cu located on the unprepared portion of the Nb/Ti cable/wire can further be removed and a metal object can be soldered directly to the plated Cu.

Figure 5:
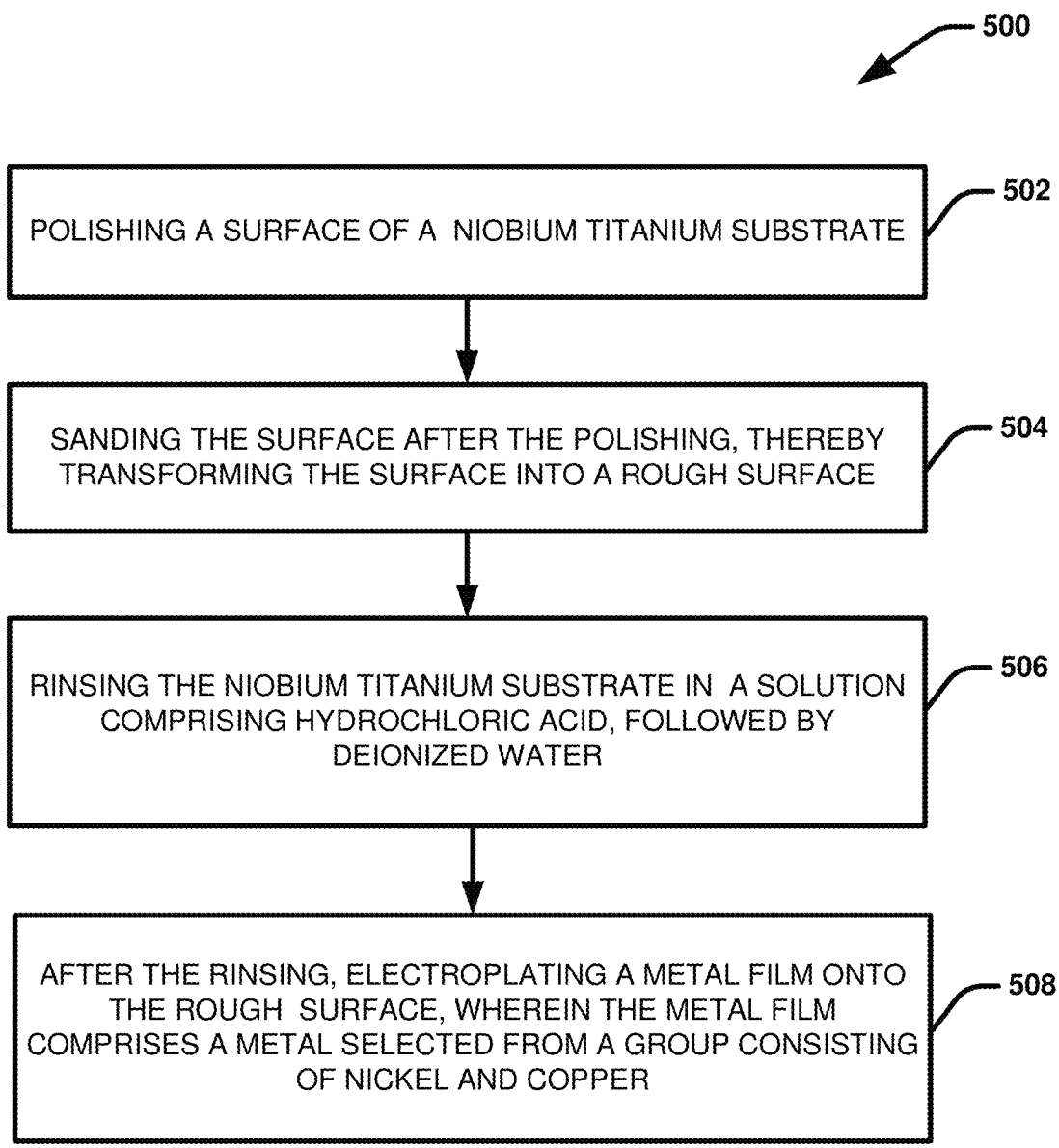
FIG. 5 presents high-level flow diagram of another example method for forming a metal layer on a surface of a Nb/Ti substrate in accordance with one or more embodiments described herein.

FIG. 5 presents high-level flow diagram of another example method 500 for forming a metal layer on a surface of a Nb/Ti substrate in accordance with one or more embodiments. In one or more embodiments, method 500 can also be employed to form structure 100. For example, method 500 can be employed to form the metal layer 108 directly on the surface of a Nb/Ti substrate layer (e.g., substrate layer 102). In this regard, method 500 can also be used to form a plated metal layer on the surface of a Nb/Ti coaxial cable/wire. Repetitive description of like elements employed in respective embodiments is omitted for sake of brevity.

At 502, a surface of a Nb/Ti substrate can be polished (e.g., using a mechanical polishing wheel). At 504, the polished surface of the Nb/Ti substrate can be sanded (e.g., as described with reference to FIGS. 4A and 4B), thereby transforming the surface into a rough surface. At 506, the Nb/Ti substrate can be rinsed in a solution comprising HCl (e.g., for about 2.0 minutes), followed by deionized water (e.g., for about 10 seconds). Then at 508, after the rinsing, a metal film can be electroplated onto the rough surface, wherein the metal film comprises a metal selected from a group comprising Ni and Cu.

Figure 6:
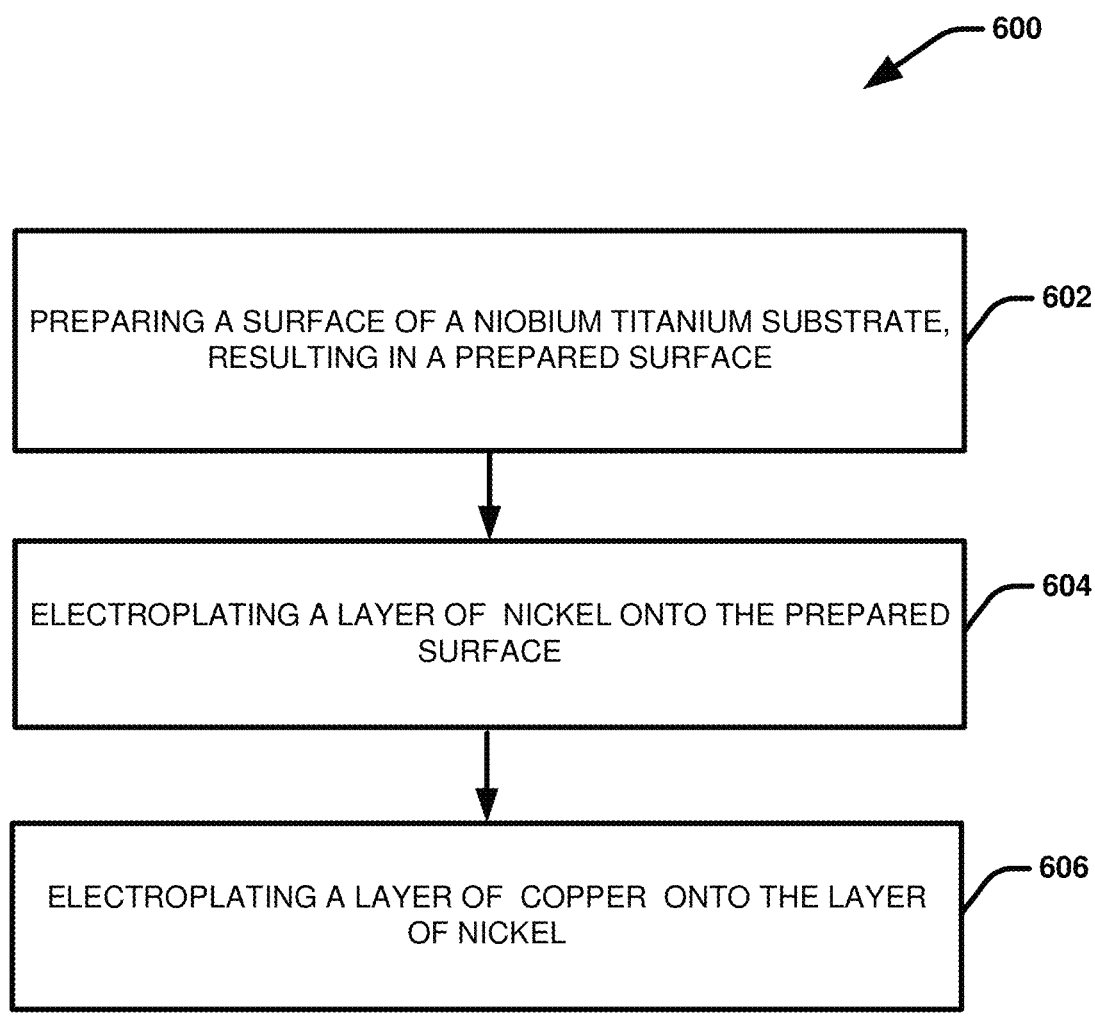
FIG. 6 presents high-level flow diagram of another example method for forming a metal layer on a surface of a Nb/Ti substrate in accordance with one or more embodiments described herein.

FIG. 6 presents high-level flow diagram of another example method 600 for forming a metal layer on a surface of a Nb/Ti substrate in accordance with one or more embodiments. In one or more embodiments, method 600 can also be employed to form structure 100. For example, method 600 can be employed to form the metal layer 108 directly on the surface of a Nb/Ti substrate layer (e.g., substrate layer 102). In this regard, method 600 can also be used to form a plated metal layer on the surface of a Nb/Ti coaxial cable/wire. Repetitive description of like elements employed in respective embodiments is omitted for sake of brevity.

At 602, a surface of a Nb/Ti substrate can be prepared (e.g., polished, sanded, HCl rinsed, etc.), resulting in a prepared surface. At 604, a layer of Ni can be electroplated onto the prepared surface. Thereafter, at 606, a layer of Cu can be electroplated onto the layer of Ni. In various embodiments, the layer of Ni can serve as a seed layer for the electrodeposition of Cu thereon.

Figure 7:
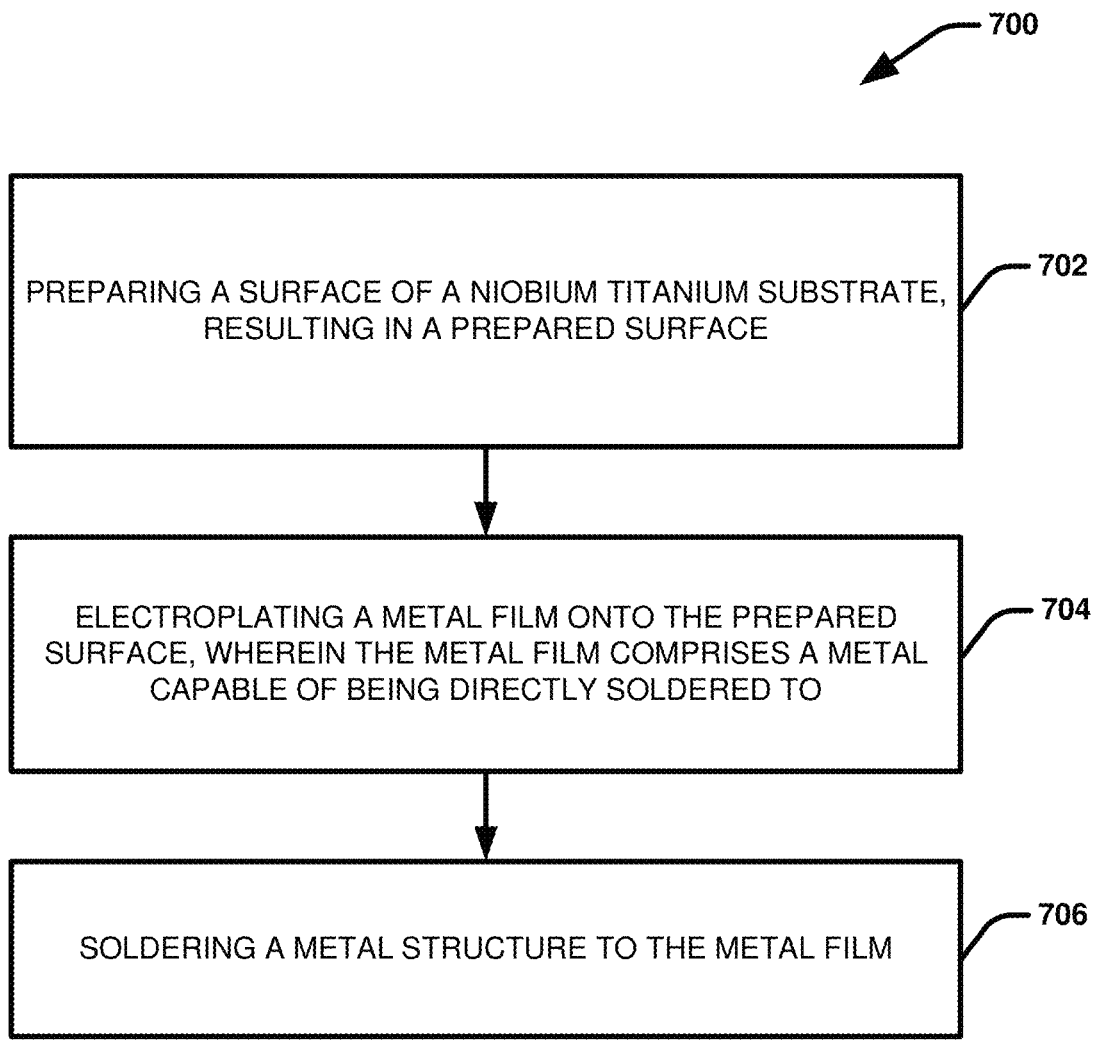
FIG. 7 presents high-level flow diagram of an example method for soldering a metal structure to a Nb/Ti substrate in accordance with one or more embodiments described herein.

FIG. 7 presents high-level flow diagram of an example method 700 for soldering a metal structure to a Nb/Ti substrate in accordance with one or more embodiments. In various embodiments, method 700 can be employed to form structure 200, a coaxial cable assembly. In this regard, method 700 can be performed to solder a metal object (e.g., one or more metal connectors 202) to a solderable metal layer (e.g., metal layer 108) plated on a surface of a Nb/Ti coaxial cable or wire (e.g., respective end portions of the cable/wire). Repetitive description of like elements employed in respective embodiments is omitted for sake of brevity.

At 702, a surface of a Nb/Ti substrate can be prepared (e.g., polished, sanded, HCl rinsed, etc.), resulting in a prepared surface. At 704, a metal film can be electroplated onto the prepared surface, wherein the metal film comprises a metal capable of being directly soldered to (e.g., using a standard low temperature soldering procedure below 350° C.). Thereafter, at 706, a metal structure (e.g., one or more metal connectors 202) can be soldered to the metal film in in accordance with standard Cu to Cu soldering techniques or similar soldering techniques. For example, in various embodiments, method 700 can be used to form an electroplated metal film or metal layer 108 onto one or both ends of a Nb/Ti coaxial cable. For instance, in one embodiment, the metal film or metal layer can comprise Ni, Cu, or a combination of Ni and Cu (e.g., a Ni layer with a Cu layer formed thereon). Thereafter, a metal connector, such as a microwave connector (e.g., a SMA type connector) can be soldered to the metal film or metal layer 108 using a standard low temperature soldering process. In particular, because the plated metal layer is both solderable and has excellent mechanical adhesion to the parent metal, it permits the attachment of a standard microwave connector using a same or similar soldering technique used for ordinary Cu coaxial cable.

In this regard, in various embodiments, at 706 the metal structure can be soldered to the metal film by the use of standard low temperature soldering techniques (e.g., involving the use of flux such as rosin or acid, with heat typically less than 350° C.), and a low temperature solder material (e.g., lead/tin, silver/tin, and the like). Accordingly, with method 700, a metal connector can be efficiently soldered to the end of a Nb/Ti cable without the need and the corresponding drawbacks of a high vacuum soldering procedure, an ultrasonic soldering iron, and/or a solderable sleeve spot welding procedure. The resulting cable assembly (e.g., structure 200) that can be formed using method 700 can operate in extremely low-temperatures (e.g., less than 1.0 Kelvin), with excellent transmission and no undesirable reflections. The mechanical strength at all temperatures is likewise indistinguishable from an ordinary terminated copper coaxial line.

Figure 8:
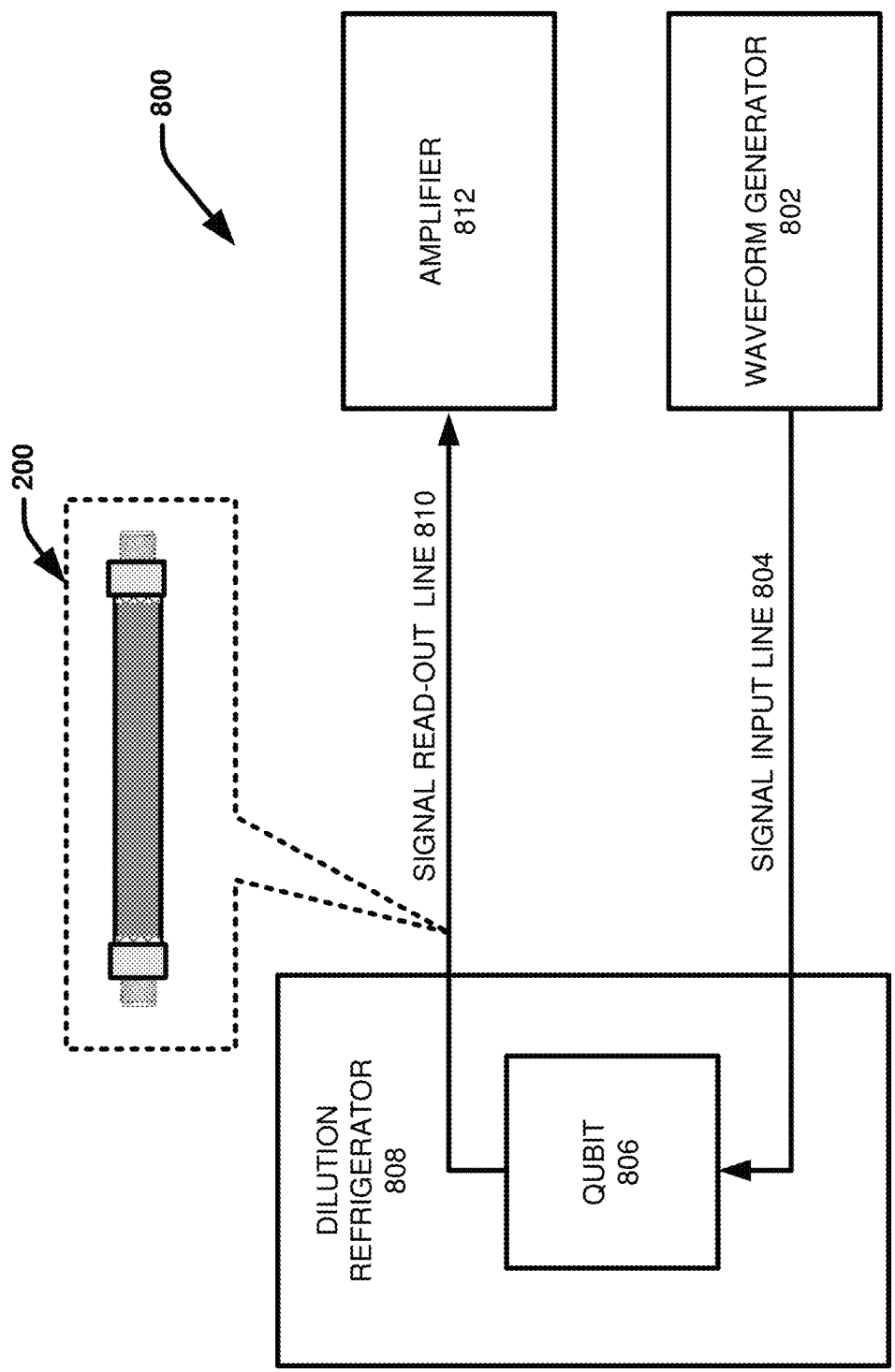
FIG. 8 presents an example qubit system comprising a Nb/Ti cable assembly in accordance with embodiments described herein.

FIG. 8 presents an example qubit system 800 comprising a Nb/Ti cable assembly in accordance with embodiments described herein. Repetitive description of like elements employ in respective embodiments is omitted for sake of brevity.

In the embodiment shown, the qubit system 800 comprises a qubit 806 provided within a dilution refrigerator 808. The qubit 806 is physically coupled to an amplifier 812 via a signal read-out line 810. In one or more embodiments, the signal read-out line 810 can be or comprise a cable assembly corresponding to structure 200. In this regard, the signal read-out line 810 can comprise an Nb/Ti coaxial cable or wire with metal connectors soldered to respective ends of the Nb/Ti coaxial cable via a plated metal layer formed on the surface of the respective ends of the Nb/Ti coaxial cable. In various embodiments, a first end of the Nb/Ti coaxial cable can be connected to the qubit 806, either directly or via one or more intervening circuit elements (not shown), via a first metal connector soldered thereto to the first end of the Nb/Ti coaxial cable. Likewise, a second end of the Nb/Ti coaxial cable can be connected to the amplifier 812, either directly or via one or more intervening circuit elements (not shown), via a second metal connector soldered thereto to the second end of the Nb/Ti coaxial cable. Qubit system 800 further includes a waveform generator 802 physically connected to the qubit 806 via a signal input line 804.

Present state of the art for operating superconducting qubits such as qubit 806 requires the use of cavity quantum electrodynamics (CQED), wherein microwave signals are applied (e.g., via the waveform generator 802 and the signal input line 804) to parts of the qubit read-out circuit to probe the quantum state of the qubit. These signals are then passed to the amplifier 812 to facilitate the final determination of the qubit state. Because the qubit experiments need to be performed at ultra-low temperatures, the qubit samples are installed in a dilution refrigerator, such as dilution refrigerator 808. The operation of the dilution refrigerator imposes many trade-offs in the design of the qubit experiment. Possibly the most important obstacle involves being able to pass the microwave read-out signals from the sample stage to an intermediate cold amplifier (e.g., amplifier 812) at 4.0 Kelvin. It is critical to reduce the attenuation and impedance mis-match on the coaxial signal read-out line (e.g., signal read-out line 810) that connects the qubit 806 to this amplifier 812. The thermal requirements of the dilution refrigerator 808 preclude the use of low electrical loss copper coax, and the usual approach for common connections (high-resistance stainless or cupro-nickel coax), have far too much attenuation for this application.

Usage of the subject Nb/Ti coaxial cable assembly (corresponding to structure 200) for the qubit signal read-out line provides an ideal solution to this problem. In particular, the thermal conductivity of the Nb/Ti alloy approaches zero when it becomes superconducting at around 11 Kelvin. The electronic contribution to the thermal conductivity goes to zero as a result of the Cooper electron pairing, and the phonon contribution to thermal conduction is spoiled by the introduction of titanium into the niobium metal which forms phonon scattering sites. In this regard, the subject Nb/Ti coaxial cable assembly (corresponding to structure 200) provides excellent microwave properties, including low attenuation, constant impedance, and the absence of any undesirable signal reflections. For the specific application of qubit readout, the frequency range of the Nb/Ti coaxial cable assembly can extend up to about 10.0 GHz.

What has been described above includes examples of the embodiments of the present invention. It is, of course, not possible to describe every conceivable combination of components or methodologies for purposes of describing the claimed embodiments, but it is to be appreciated that many further combinations and permutations of the subject innovation are possible. Accordingly, the claimed embodiments are intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In this regard, with respect to any figure or numerical range for a given characteristic, a figure or a parameter from one range may be combined with another figure or a parameter from a different range for the same characteristic to generate a numerical range. Other than in the operating examples, or where otherwise indicated, all numbers, values and/or expressions referring to quantities of ingredients, reaction conditions, etc., used in the specification and claims are to be understood as modified in all instances by the term "about."

While there has been illustrated and described what are presently considered to be example features, it will be understood by those skilled in the art that various other modifications may be made, and equivalents may be substituted, without departing from claimed embodiments. Additionally, many modifications may be made to adapt a particular situation to the teachings of the claimed embodiments without departing from the central concept described herein. Therefore, it is intended that embodiments not be limited to the particular examples disclosed, but that such claimed embodiments may also include all aspects falling within the scope of appended claims, and equivalents thereof.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A structure, comprising:
   a niobium titanium substrate;
   a metal layer plated on a portion of the niobium titanium substrate;
   a coaxial connector attached to the metal layer;
   a qubit attached to the coaxial connector; and
   an amplifier attached to another portion of the niobium titanium substrate.

2. The structure of claim 1, wherein the metal layer comprises an electroplated metal layer plated on the portion of the niobium titanium substrate using electroplating.

3. The structure of claim 1, wherein the metal layer comprises a first layer of nickel adhered directly to a surface of the portion of the niobium titanium substrate, and second layer of copper adhered to the first layer of nickel.

4. The structure of claim 1, further comprising:
   a metal contact surface soldered to the metal layer.

5. The structure of claim 4, wherein the coaxial connector is attached to the metal contact surface of the metal layer.

6. The structure of claim 5, wherein the coaxial connector comprises a microwave coaxial connector.

7. The structure of claim 5, wherein the coaxial connector comprises a sub-miniature version A (SMA) type connector.

8. The structure of claim 1, wherein the niobium titanium substrate comprises a niobium titanium wire.

9. A cable assembly, comprising:
   a niobium titanium wire;
   a metal layer plated on a first portion of the niobium titanium wire;
   a metal coaxial connector soldered to the metal layer, wherein the metal coaxial connector comprises a microwave connector;
   a qubit attached to the metal coaxial connector; and
   an amplifier attached to a second portion of the niobium titanium wire.

10. The cable assembly of claim 9, wherein the metal layer comprises an electroplated metal layer plated on the first portion of the niobium titanium wire using electroplating.

11. The cable assembly of claim 9, wherein the metal coaxial connector comprises a microwave connector.

12. The cable assembly of claim 9, wherein the first portion of the niobium titanium wire comprises an end portion of the niobium titanium wire.

13. The cable assembly of claim 9, wherein the metal coaxial connector comprises a sub-miniature version A (SMA) type connector.

14. A method, comprising:
   preparing a surface of a niobium titanium substrate, resulting in a prepared surface, wherein the preparing comprises:
      polishing the surface of the niobium titanium substrate using a mechanical polishing wheel, and
      sanding the surface of the niobium titanium substrate; and
   electroplating a metal film onto the prepared surface.

15. The method of claim 14, wherein the preparing further comprises, after the sanding, dipping the surface of the niobium titanium substrate in a hydrochloric acid solution.

16. The method of claim 14, further comprising:
   soldering a metal surface to the metal film.

17. The method of claim 16, wherein the metal surface comprises a coaxial connector.

18. The method of claim 17, wherein the coaxial connector comprises a microwave coaxial connector.

19. The method of claim 17, wherein the coaxial connector comprises a sub-miniature version A (SMA) type connector.

20. The method of claim 16, wherein the niobium titanium substrate comprises a niobium titanium wire.

* * * * *